United States Patent Office 2,824,078
Patented Feb. 18, 1958

2,824,078

EPOXY RESIN-AMINE PITCH COMPOSITION AND PROCESS OF MAKING SAME

Charles Mellick, Chicago, Ill., assignor to Dearborn Chemical Company, Chicago, Ill., a corporation of Illinois No Drawing. Application November 23, 1954
Serial No. 470,819

11 Claims. (Cl. 260—28)

This invention relates to synthetic resinous compositions, and more particularly, to complex epoxide compositions having improved properties, and a method of preparing such compositions.

Although the compositions of the instant invention have a number of uses, one use of particular importance for the instant compositions is in the coating of buried pipe lines for protection. Plastic materials of various types are currently being used both for the production of plastic pipe as well as providing coatings for steel pipe. Such coatings must be impervious to petroleum products, chemicals, acids, alkalis, etc. Also, such coatings must have superior adherence to the pipe material, particularly the steel pipe. In addition, impact resistance is required, because the ordinary rough handling which such coated pipes receive would result in the chipping off of a brittle coating material.

Expense is also an important consideration in the construction fields, which include the coating of metal pipes, construction steel, girders, etc. for protection. The instant invention provides a unique relatively inexpensive resinous material, employing as one of its important components a material heretofore considered to be primarily a waste product. In addition, the instant invention provides a resin which possesses superior bonding to metal, high impact resistance, imperviousness to water, hydrocarbons, acids, alkalis, etc. and ease of curing.

It is, therefore, an important object of the instant invention to provide an improved resinous composition and an improved method of making the same.

It is a further object of the instant invention to provide a resinous composition that is capable of conversion to an infusible insoluble resin, which composition comprises an epoxide resin and a polyamine-fatty acid pitch reaction product, both in substantial amounts, which composition is capable of heat reaction and/or cold (catalyzed) curing to obtain an insoluble infusible resinous product having good bonding properties with metals, high impact resistance, and imperviousness to water, hydrocarbons, acids, alkalis, etc.

It is yet another object of the instant invention to provide an improved method that comprises heat reacting and/or cold (catalyzed) curing the epoxide resin and the polyamine-fatty acid pitch condensate hereinbefore described; and it is also an object of the instant invention to provide the resulting infusible insoluble heat and/or catalyzed reaction product.

Other objects, features and advantages of the instant invention will become apparent to those skilled in the art from the following detailed disclosure thereof showing preferred embodiments.

The instant invention consists in an improved composition comprising, in substantial amounts, (a) epoxide resin resulting from the reaction of a polyhydric phenol free from reactive groups other than phenolic hydroxyl groups with an excess of a compound of the class consisting of aliphatic polyepoxide and aliphatic epihalohydrin, such compound being free from reactive groups other than epoxide, halogen and alcoholic hydroxyl groups and (b) condensate resulting from the reaction of a polyamine with fatty acid pitch; and an improved method of cold curing the composition and the cold (catalyzed) cured product; and an improved method of preparing a heat reaction product that comprises heating the instant composition; and an improved infusible insoluble resinous product that is the heat reaction product of the instant composition.

The epoxide resin (a) used as one of the essential ingredients in the practice of the instant invention involves a well known class of resins, many of which are commercially available. Such resins are formed by the reaction of (1) an aliphatic polyepoxide or epihalohydrin, the most commonly used being epichlorhydrin

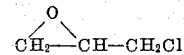

with (2) a dihydric phenol, the most commonly used being diphenylol propane or diphenylol dimethyl methane:

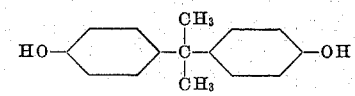

The resulting resin structure is believed to be as follows:

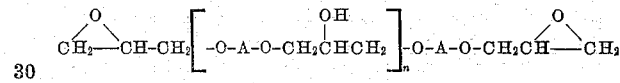

wherein $n$ is an integer from 1 up determining the polymer chain length and the A's are aromatic nuclei which are the hydrocarbon nuclei of the dihydric phenol used (being free of functional groups other than phenolic hydroxy groups). In a more simple form the structure is

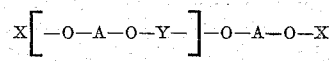

wherein the Y's are intermediate aliphatic chains that are alcoholic hydroxy-containing chains free from functional groups other than alcoholic hydroxy groups and the X's are terminal aliphatic chains having epoxide groups and being free from functional groups other than alcoholic hydroxy and epoxide groups. It will be appreciated that if a diepoxide is used instead of epichlorhydrin, such as diglycid ether, the terminal aliphatic groups X will contain an alcoholic hydroxy group as well as an epoxide group.

It will thus be seen that the epoxide resins here used are complex resinous epoxides which are polymeric polyethers of polyhydric phenols, and preferably dihydric phenols, which polyhydric phenols are free from functional groups other than phenolic hydroxy groups. These resinous epoxides have a plurality of aromatic nuclei alternating with intermediate and terminal aliphatic chains united through ether oxygen, the aromatic nuclei being the hydrocarbon nuclei of the polyhydric phenols, the intermediate aliphatic chains being alcoholic-hydroxy containing chains free from functional groups other than alcoholic hydroxy groups, and the terminal aliphatic chains having epoxide groups (and possible alcoholic hydroxy groups) and being free from functional groups other than epoxide groups and alcoholic hydroxy groups. As will be appreciated, in order to obtain the desired chain-like structure, the initial epoxide component should be di-functional (i. e., a diepoxide or an epihalohydrin) and the phenolic component should also be di-functional (i. e., a dihydric phenol) and unless both components are di-functional there is a tendency to form a three-dimensional polymer and polymerization or initial reaction can involve the formation only of a few polymeric units before the resinous material is effectively converted into an infusible insoluble material. The instant invention does not preclude the use of an epoxide and/or phenolic component which has more than two functional groups thereon, but the reaction involving such ingredients should not be carried far enough to convert the product to an infusible insoluble product before the polyamine-fatty acid pitch condensate has been incorporated therein.

The polyhydric phenols used in making the instant products and compositions include phenols containing two or more phenolic hydroxyl groups which may be in one nucleus as in resorcinol or in different nuclei of fused ring systems as in 1,5-dihydroxy naphthalene, or in different nuclei of ring systems attached by chains composed of one or more atoms, in which case the chains should be free from elements which interfere with the reaction of the polyepoxides with the phenolic hydroxyl groups. The phenolic nuclei or the chains linking phenolic nuclei may contain substituents providing they do not interfere with the desired reaction of the polyepoxide with the phenolic hydroxyl groups. Illustrative of polyhydric phenols which may be used in making the new complex polymerization products are mononuclear phenols such as resorcinol, hydroquinone, catechol, phloroglucinol, etc. and polynuclear phenols such as bis phenol (p,p'-dihydroxy diphenyl dimethyl methane), p,p'-dihydroxy dibenzyl, bis-(4-hydroxy phenyl) sulfone, 2,2'-dihydroxy 1,1'-dinaphthyl methane, polyhydroxy naphthalenes and anthracenes, o,o'-p-p'-tetrahydroxydiphenyldimethylmethane and other dihydroxy or polyhydroxy diphenyl or dinaphthyl dialkyl methanes, etc.

The polyhydric phenols may themselves be complex reaction products, e. g. of 2 mols of a dihydric phenol with 1 mol of a diepoxide, or of 3 mols of a dihydric phenol with 2 mols of a diepoxide, etc., and containing free phenolic hydroxyls on each terminal dihydric phenol nucleus. More complex and higher polymeric products resulting from the reaction of, e. g., dihydric phenol with less than the equivalent amount of diepoxide to give reaction products containing terminal phenolic hydroxyl groups, can similarly be used.

The polyhydric phenols may also be complex reaction products of simpler polyhydric phenols, such as bis phenol, with dichlorides such as dichlordiethyl ether, dichlorbutene, etc. in the presence of caustic soda and in proportions so that the resulting reaction products will contain terminal phenolic hydroxyl groups. Thus a complex polyhydric phenol may be produced from bis phenol with dichlordiethyl ether and caustic alkali which may be assumed to have the following formula:

$$HOR[OCH_2CH_2OCH_2CH_2OR]_nOH$$

in which R is the residue from bis phenol and $n$ indicates the degree of polymerization which may be, e. g., 1, 2, etc. Complex polyhydric phenols from, e. g., bis phenol and dichlorbutene with the use of caustic alkali may be assumed to have the following general formula:

$$HOR[OCH_2CH=CHCH_2OR]_nOH$$

in which R and $n$ have the meaning indicated above. The complex polyhydric phenols thus produced from dichlorides and simpler polyhydric phenols are more complex or polymeric products in which, e. g., two simpler dihydric phenol residues are united through a residue from the dichloride. With less than two molecular proportions of the simpler dihydric phenol to one of the dichloride, and with the simpler dihydric phenol used in excess of the dichloride, a polymeric product is produced in which, e. g., 3 mols of dihydric phenol are reacted with 2 mols of dichloride; or to give products of a higher degree of polymerization.

In special cases complex polyhydric phenols may be used which are produced by the reaction of dibasic acids with polyhydric phenols such as bis phenol to give products which, in the case of the use of adipic acid with bis phenol, may be considered to have the following formula:

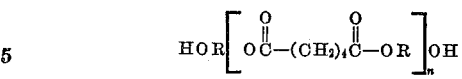

in which R is the residue from the bis phenol and $n$ the degree of polymerization. Similar products can be made from other dibasic acids.

The polyepoxides used for reaction with the polyhydric phenols contain two or more epoxide groups. The simplest diepoxides will contain at least four carbon atoms, as in the case of 1,2-epoxy-3,4-epoxy butane. The epoxy groups may be separated from each other by ether groups or linkages as in the case of bis-(2,3-epoxy propyl) ether, bis-(2,3-epoxy 2-methyl propyl) ether, etc. The polyepoxides may also be of a somewhat more complex character such as those which result from the reaction of 2 or more mols of a diepoxide with 1 mol of a dihydric phenol, or the reaction of 3 or more mols of a diepoxide with 1 mol of a trihydric phenol, etc. Diepoxides or polyepoxides derived from polyhydric alcohols such as mannitol, sorbitol, erythritol or polyallyl alcohol may also be used. The polyepoxy compounds used may have varying structures and may be of complex structure so long as they do not contain groups which interfere with the reaction between the epoxide groups and the phenolic hydroxyl groups. The polyepoxides are free from reactive groups other than epoxide and aliphatic hydroxyl groups.

The simpler diepoxides can be produced and obtained of a high degree of purity by fractional distillation to separate them from byproducts formed during their manufacture. Thus bis-(2,3-epoxy propyl) ether or diglycid ether can be produced and separated by fractional distillation to give products of high purity, e. g., around 97% or higher as determined by the method of epoxide analysis. When polyepoxides are produced of higher molecular weight and which are difficult to isolate by fractional distillation they can nevertheless be advantageously used, after purification to remove objectionable inorganic impurities and catalysts such as caustic alkali and without separation of the diepoxides or polyepoxides from admixed byproducts such as monoepoxide products, etc. Valuable polyepoxides for use in making the new compositions can be obtained by the reaction of epichlorhydrin on polyhydric alcohols containing 3 or more hydroxyl groups. Thus a trihydric alcohol such as glycerol or trimethylol propane can be reacted with epichlorhydrin in the proportions of 1 mol of trihydric alcohol to 3 mols of epichorhydrin, using a catalyst which will promote the reaction of the epoxide group of the epichorhydrin with a hydroxyl group of the alcohol, and with subsequent treatment of the reaction product to remove chlorine from the reaction product and to produce a polyepoxide. Such polyepoxides may contain, e. g., approximately 2 epoxy groups per molecule, even though 3 mols of epichlorhydrin are reacted with 1 mol of a trihydric alcohol. More complex or side reactions apparently take place which result in the production of products containing free hydroxyl groups or cyclic ring compounds or polymeric compounds which may be present in the resulting product. But such polyepoxide products can nevertheless advantageously be used as polyepoxides for reaction with polyhydric phenols in forming the new compositions.

As previously mentioned, the epoxide component used is preferably a di-functional component such as a diepoxide, glycidol or an epihalohydrin such as epichlorhydrin, which is used in the formation of many commercial epoxide resins and is generally preferred for use in the practice of the instant invention.

In general, the proportions of epoxide component and polyhydric phenol should be such that the epoxide component is used in excess of that which is equivalent to the polyhydric phenol so that all of the phenolic hydroxy groups will be reacted with the epoxide component and so that the terminal groups will be epoxide containing groups. In the case of dihydric phenols and di-functional epoxide components, the proportion of epoxide component to dihydric phenol should be more than 1 mol of epoxide component to 1 mol of dihydric phenol and may be greater than 2 mols or more of epoxide component to 1 mol of dihydric phenol.

Assuming complete reaction between all of the phenolic hydroxy groups with epoxide (or halo) groups and assuming a straight chain reaction and polymerization, the number of intermediate aliphatic epoxy residues will be one less than the number of phenolic residues and the number of terminal epoxide residues containing epoxide groups will be enough to satisfy the remaining phenolic hydroxy groups, which would be a total of two in the case of a dihydric phenol.

The reaction of the polyhydric phenols and epoxide components can be readily accomplished by heating the reactants together for a short time. In general, reaction temperatures of around 50 to 250° C. can be used. The temperature and time for any given reaction depends upon the proportions and reactivity of the reactants and whether the reaction is to be carried out completely or to an intermediate stage. In some cases, particularly employing the epihalohydrins, it is advantageous to add traces of basic catalyst such as caustic alkali to the mixtures of epoxide component and polyhydric phenol. The amount of catalyst used, if any, is an amount sufficient to carry out the catalytic function; but when the epihalohydrins such as epichlorhydrin are used as the sole epoxy component, an appreciable amount of alkali may be required in order to effectively neutralize all of the halogen acid present and the temperatures employed are preferably about 100° C.

In general, the reaction is carried out until a resinous polymer is obtained but not to such an extent as to effectively obtain an infusible insoluble polymer. The commercial resins available are resins wherein the reaction has been carried out to the intermediate stage so that these resins may be applied in solvents as coatings or the like and subsequently polymerized to the final stages. The general details of the preparation of these commercially available soluble fusible epoxide resins are well known to those skilled in the art and need not be further described herein.

The instant invention resides in the use of any of such fusible soluble epoxide resins in combination with polyamine fatty acid pitch condensates, wherein it is believed that the condensate effects the cross linking between the epoxide resin chains so as to convert the composition to an infusible insoluble material which has the superior properties of flexibility, impact resistance, adherence to metal, etc. herinbefore described.

The polyamines which may be used in the practice of the invention are polyfunctional amines in that they contain a plurality of functional groups including functional groups sufficient to react with the pitch to attach the polyamine molecule thereto in the condensate, plus groups sufficient to effect (with the assistance of any pitch reactive groups in the condensate) cross linking of the epoxide resin. The functional groups of the polyamine are, of course, mainly amino (primary and secondary) groups but also may be amido, hydroxy, thiol, etc. In general, the amino groups are the most reactive in the pitch condensation reaction and the extent of these groups present is used as a guide to the proportions of ingredients employed (unless there are to be established reaction conditions clearly drastic enough to assure that any of the other groups present will be substantially as reactive as the amino groups). As a rule, then, it is desired to retain at least two reactive hydrogens in the condensate (on one primary or two secondary amino groups) and the polyamine should have an additional reactive (amino) hydrogen for condensation with the pitch.

The polyamine may be saturated or unsaturated, and acyclic or cyclic (aromatic, alicyclic, heterocyclic, etc.) usually containing no atoms other than C, H, N, O and S, with the last two being used primarily in aloholic or ether groups (or heterocyclic rings). Among the alkylene amines $C_2$–$C_6$ alkylene diamines, preferably ethylene diamine and hexamethylene diamine may be used; and poly $C_2$–$C_6$ alkylene $N_3$–$N_5$ polyamines may be used, such as diethylene triamine, triethylene tetramine, tetraethylene pentamine, dipropylene triamine, etc. The polyalkylene polyamines are preferred, most preferably triethylene tetramine.

Other polyamines which may be used include aromatic diamines such as phenylene diamine, diphenyl methylene bisdiamine, etc. and heterocyclic compounds such as a substance whose molecule has a plurality of $NH_2$ groups each attached to a triazole ring, such as guanazole,

1-phenylguanazole,

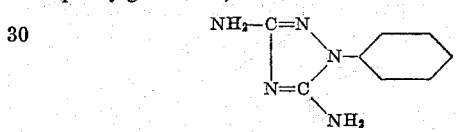

4-aminoguanazole,

a quinazoline such as 2,4-diaminoquinazoline,

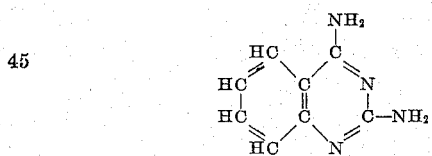

a substance whose molecule contains a plurality of $NH_2$ groups each attached to a triazine ring, e. g., a diamino triazine (i. e., a guanamine) such as acetoguanamine,

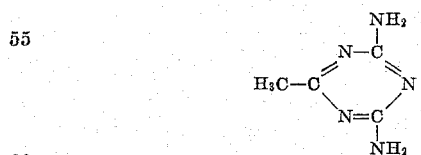

benzoguanamine,

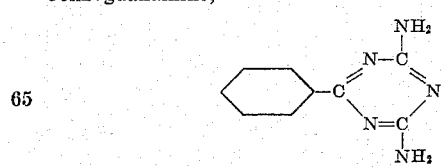

or formoguanamine,

triamino triazine (i. e., melamine),

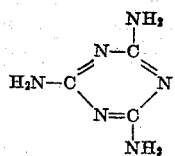

sebacoguanamine,

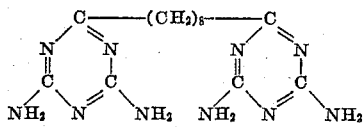

adipoguanamine,

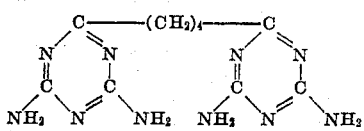

Alkyl or alkenyl melamine, such as allyl melamine,

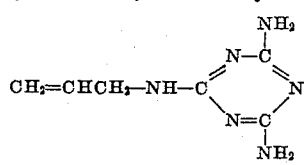

Substances containing O or S, such as diamino thiodiazole,

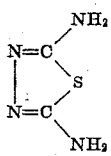

diamino oxadiazole,

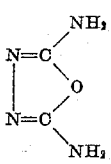

2,4-diamino-6-hydroxy pyrimidine,

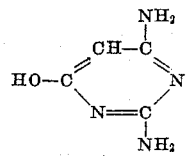

2,4-diamino-pyrimidine-6-thiol,

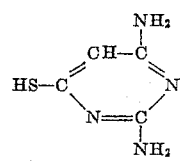

In the instant polyfunctional polyamine, the number of amino groups has a maximum practical limit of perhaps five although no theoretical maximum. The minimum is that sufficient to afford at least two reactive points or groups (preferably, reactive H's attached to the same or different N's) in the condensate so that linkages may be formed with one epoxide resin molecule at each such point to complete the cross link. Under the condensation conditions, the amino groups are most reactive. The same is true of the cross linking reaction, particularly in cold curing. Nevertheless, cross linking alone is not the only consideration. Such features as improved moisture resistance, flexibility, and impact resistance are also believed to involve physical and chemical phenomena; and the superiority of the instant resins in this respect is believed to be based upon the presence of groups in the condensate which are derived from the use of the pitch. Such groups in the condensate may be reactive or unreactive during condensation and/or reactive or unreactive during cross linking; but their presence contributes to the above mentioned advantageous results.

In general, the most important reactive groups in the polyamine-pitch condensate (and preferably also the polyamine per se) are understood to be amino and amido groups. The polyamine has, of course, some groups (i. e. amino) which form amide linkages with the pitch and extra groups which subsequently react with the epoxide resin. The polyamine and pitch are reacted in such molar proportions (based upon the saponification value of the pitch) as to insure that the resulting condensate contains at least one primary amino group or at least two secondary amino groups. Assuming all of the acid-reacting functional groups of the pitch to be carboxylic acid groups, the pitch could have a formula such as $$Rp\text{—}COOH$$

and the condensation reaction would be as follows:

(a)
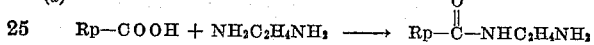

(b)
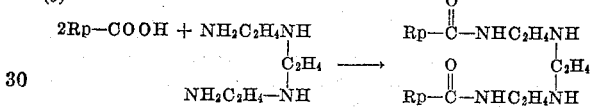

Equation *a* shows a product with one primary amino group and Equation *b* shows a product with two secondary amino groups.

It should be emphasized, however, that this is an assumption for purposes of illustration only. Data shows that the carboxylic acid content of the instant pitches is relatively low; for example, stearine pitch shows an acid value of only 32–36 whereas its saponification number may reach 135. There are also numerous other reactive functional groups in such pitches which have yet to be elucidated. For instance, some such groups discussed subsequently are ether, ester, lactone, olefinic, etc.

The fatty acid pitches are a well known class of materials, which generally have been considered to be waste materials. These pitches are obtained as by-products from operations which involve the heat treatment of the various fats and oils in such operations as soap and candle stock manufacture, refining and/or hydrolysis of vegetable oils, refining of refuse greases, and refining of wool grease. The various pitches are named by the source from which they are derived, such as stearine pitch, candle-tar pitch, candle pitch, fat pitch, bone-fat pitch, cottonseed oil pitch, wool fat pitch, tall oil pitch, marine (marine animal fat or oil) pitch, etc. In general, these pitches are obtained by the effect of heat upon the various $C_8\text{–}C_{22}$ fatty acids, usually during the thermal hydrolysis of glycerides of these acids (in the form of natural fats and oils). In the practice of the instant invention, pitches obtained from heat treatment of vegetable fatty acids and glycerides, such as cottonseed pitch are preferred.

In general, such pitches have dark brown to black color. The fusing point of such pitches is within the range of about 35 to 225° F., and other general properties include flash point 450 to 650° F., saponification value 60 to 200 and acid value (including lactone value) 2 to 100.

As an example of the formation of a condensate for use in the instant invention, a charge of 842 grams of cottonseed pitch (Armour & Company) and 146 grams of triethylene tetramine was put in a two liter resin reaction flask fitted with a stirrer, thermometer and water trap; and the reactants were heated to 370° F. and kept at this temperature for two hours. Based on the saponification value of the cottonseed pitch, this involved a reaction of 2 gram mols of pitch with 1 gram mol of triethylene tetramine to form a cottonseed pitch diamide, which is jet black colored, pasty and sticky in consistency. In estimating the mol equivalents of pitch to be used in condensation reactions the saponification value is used. This is expedient in view of the complex nature of these pitches. The amine-cottonseed pitch condensate thus obtained is admixed with an equal amount of commercial epoxide resin and heated to about 210° F. for about five minutes and then applied to a steel surface and allowed to cure overnight at room temperature. The resulting coating adheres tenaciously to the steel and is black, slightly resilient and thermosetting in properties. The commercial epoxide resin used is an alkaline reaction product of epichlorhydrin and diphenylol propane.

Another reaction was carried out using stearine pitch (Hardesty and Company) having an acid value of 32.3 and a saponification value of 134. A charge of 209 grams of stearine pitch and 42.9 grams of ethylene diamine is added to a flask equipped with a stirrer, thermometer and water trap. The pitch is added first and heated to obtain fluidity and the amine is added thereafter. The charge is heated over a period of two hours to about 350° F. and maintained at this temperature for two hours during which time condensation (of the effective saponification value with an amine) is completed. The resulting ethylene diamine-stearine pitch condensate is heated to 150° F. and commercial epoxide resin (Epon 828—epichlorhydrin alkaline reaction product with diphenylol propane) in an equal amount is added and the mixture is heated to 210° F. with stirring and held there for five minutes. The mixture is then applied to a steel surface and allowed to complete the cure. The product is a hard black glossy thermoset coating which adheres tenaciously to the steel.

In general, the reaction between the polyamine and the pitch is carried out using elevated temperatures of at least about 50° F. and preferably about 100° F. above the boiling point of water (under the pressure used for the reaction), for a time sufficient to effect completion of the reaction (which may be determined on the basis of the saponification value). The reaction temperature is preferably about 100 to 150° above the boiling point of water under the reaction conditions, and using atmospheric pressure, the reaction temperature is, of course, determined to a substantial extent by the volatility of the amine, since the vaporization temperature of the pitches is about 500° F.

In general, the amine should contain 1 molar equivalent of a reactive amino group for each molar equivalent of pitch (based upon the saponification value) plus an additional amount of reactive amine groups which must be at least 1 additional molar equivalent of a primary amine or at least 2 additional molar equivalents of a secondary amine. In other words, the ratio is such that for each molar equivalent of pitch based on its saponification value there is one molar equivalent of a reactive amino group in the polyamine plus the molar equivalent of at least two additional amine hydrogen atoms (on primary or secondary amine groups). Still greater amounts of primary and secondary amino groups can be present up to about twice as much as the minimum here indicated in the final amine-pitch condensate, but an excessive number of amino groups over those here indicated may tend to unnecessarily accelerate the curing of the epoxide resin because of the basic character of the amino groups. In general, the instant amine-pitch condensates are cold curing agents for the epoxide resins; but it will be appreciated that it is desirable to have at least a certain amount of delay in effecting the cold curing of the epoxide resins so as to have time to apply mixtures of the epoxide resins and the amine-pitch condensates to a surface to be coated, for example. Also, small amounts of alkaline catalysts may be added if more rapid curing is desired in a specific embodiment.

Other catalysts may be used advantageously, such as for reducing water absorption, comprising such compounds as dialdehydes (glyoxal), boron fluoride and polyamides (free of functional groups other than amide groups). Cold curing may be expedited by incorporation of special catalysts, e. g., boron fluoride, di-isocyanates, polyamines, etc. Heating will, of course, also accelerate the rate of curing and hot spraying is a commercial method for achieving such heating, whereby the epoxide resin and condensate would be admixed in a hot spray and driven against the surface to be coated.

Although the epoxide resin and the instant condensate in admixture comprise a "cold curing" resin in the industrial sense of the word, the conversion of this composition to an infusible insoluble material in a reasonable period of time often requires some heat and/or a catalyst of the type described. The greater amount of heat used the more quickly the cure will be effected; but the carrying out of the curing reaction as a practical matter requires heat from at least about room temperature to perhaps 200° F.

In admixing the condensate and the epoxide resin, it has been found that the epoxide resin to amine-pitch condensate weight ratio should be at least about 1:4 in order to obtain a thermosetting composition and, if the weight ratio is above about 10:1 the improved effect imparted to the ultimate composition by the condensate is not particularly noticeable. Also, the epoxide resin to amine-pitch condensate weight ratio may be as low as 1:10 in order to obtain a useful resinous product, but the bulk of the amine-pitch condensate therein functions more as a plasticizer than a reactant and the product is not clearly thermosetting. The lower useful range of the epoxide resin is about 1½ to 3½ parts per 10 parts of amine-pitch condensate.

Also, it has been found that plasticization using inert petroleum derivative plasticizers may be used. Such plasticizers are sold under the trade name "Indonex" and are petroleum derivatives (extracted from Lube Oil Distillates by 2,2'-dichloroethyl ether, "Indonex 637½" being such an extract having a distillation temperature at 1 mm. Hg of 448° F. for 10% and 514° F. for 30% thereof, a Saybolt viscosity at 210° F. of 307 seconds, a specific gravity of 0.997, a bromine No. 21, an approximate molecular weight of 480, and a refractive index at 20° C. of 1.568) used as softeners and plasticizers in natural and synthetic rubbers. These materials are available in several grades ranging from a mobile liquid to a semi-solid at normal temperatures. The instant compositions permit the use of up to 33⅓% of the "Indonex" oils as plasticizers so as to impart resiliency to the final composition. Other plasticizers ordinarily used in rubber may also be used in the same amounts.

For example, a charge of 210.5 grams of cottonseed pitch (acid value, 44; saponification value, 133) and 42.9 grams of ethylene diamine was heated in a suitable flask with a stirrer, thermometer and water trap to about 350° F., over a period of two hours, and was held at this temperature for an additional two hours in order to complete the condensation reaction. The product was a black sticky paste-like mass. A charge of 20 grams of the product and 20 grams of a plasticizer (Indonex 637½) was heated together and stirred at 150° F. and commercial epoxide resin (Epon 828—epichlorhydrin alkaline reaction product with diphenylol propane), in an amount of 20 grams, was added to the mixture and the mixture was heated to 210° F. and held there for five minutes. The viscosity increased gradually as the mass was held at the elevated temperature and application of the mass to a steel surface was carried out thereafter, permitting the curing to take place overnight. The resulting product is a black rubber-like coating which adheres well to the steel and is an insoluble infusible material.

Another cottonseed pitch product is prepared according to a procedure that is the same as that described in the foregoing paragraph except that 36.5 grams of triethylene tetramine is used in place of the 42.9 grams of ethylene diamine. The result obtained is similar.

Using a water absorption test standardized for use with bituminous coatings (wherein the water absorption is a function of the weight of water absorbed over a given time period) it was found that the two cottonseed pitch specimens just described had water absorption test results of 34.0 milligrams in three days and 27.5 milligrams in three days, respectively, whereas a commercial polyamide cured epoxide resin has a water absorption of 93.2 milligrams in three days in a comparable test. Superior impact test results were also obtained.

Comparable results may be obtained using the procedures described in the three previous paragraphs, except that the cottonseed pitch is replaced by animal fat pitch (Zeco 24, M. P. 100°/130° F., penetration range 75/250), palm base pitch (Zeco 211, M. P. 70°/80° F., penetration 250 up), tall oil pitch (Zeco 22, M. P. 85°/95° F.), vegetable pitch (Zeco 213 linseed, semiliquid), tall oil pitch (Armour, saponification number 120–140, dropping point 25–45° F.) and/or marine pitch (M. P. 95./105° F.).

Comparable results may be obtained using any of the other amines, and particularly, orthophenylene diamine, melamine, guanidine and amino ethyl ethanolamine. Comparable results will also be obtained using various other epoxide resins such as a diglycid ether-bis phenol resin (3.9 parts diglycid, 4.6 parts bis phenol and 0.064 aqueous 20% sodium hydroxide heated for 30 minutes).

Generally speaking, any of the fatty acid pitches may be used in the invention; and these products are well known in the art as having only limited use. They are the residues obtained from the distillation of fatty acids (containing at least about 10% unsaturated acids and preferably at least about 50% as in the case of most natural oils and fats). These pitches contain free fatty acids, esters, lactones, ketones, glycerides, polymerization products, condensation products, hydrocarbons, cholesterol and/or higher alcohols. In the instant invention the polyfunctional polyamines react therewith to form a stable chemical bond, presumably an amide bond in most cases, and condensation reaction is carried out on this basis using proportions based on the saponification number and reaction conditions for amide group formation.

As mentioned previously, the polyamine is preferably free from reactive groups more reactive than amino and amide groups; but should contain enough reactive groups (i. e. amino, etc.) to permit reaction of the polyamine molecule with the pitch while retaining in the polyamine residue at least two reactive H groups attached to N. Thus, at least one primary amino or at least two secondary amino groups must be left in the polyamine residue in the usual case, so that a cross-link can be formed thereby between two epoxide resin chains or molecules during curing. Amide groups originally present in the polyamine and/or formed during condensation may participate in the epoxide cross-linking reaction.

It is thus believed that; in the instant condensate the polyamine molecules (or residues) are attached to pitch molecules (or residues) primarily through amido (imido) linkages; and the cross-linking reaction involves connection of the condensate and epoxide resin primarily through amino (secondary or tertiary) linkages resulting from reaction of amino groups and epoxy groups. To a lesser extent amido groups present may participate, particularly in the cross-linking reaction. Other less reactive groups, such as hydroxy, thiol, etc., may not participate appreciably in the condensation or cross-linking reaction under moderate conditions and thus remain as a possible point of reaction (and/or hydrophilic group) in the final product; the polyamine is preferably free from reactive groups other than amino and amide groups. Also, the polyamine-pitch condensate may be considered to be an "amide" condensate, since the known conditions of heat, water removal, etc. for amide formation are the condensation conditions used.

In general, the reaction between the epoxide resin (a) and the polyamine-pitch condensate (b) is a cross-linking reaction for curing the resin. Cross-linking reactions for curing epoxide resins are known. This one differs from the prior art in the cross-linking agent used (which provides an unobviously superior cured resin composition). The instant method thus comprises curing the epoxide resin (a) by cross-linking the resin (a) with the polyamine-pitch condensate. Acceleration of the cross-linking reaction is effected by heat and/or catalysis. Cold (catalytic) curing his industrial advantages and cold curing with dialdehyde catalysts is advantageous in that water absorption is reduced in the cured composition. For example, using the triethylene tetramine-cottonseed pitch condensate described on page 17 herein and Epon 828; in equal amounts, admixed with 2 weight % of glyoxal (a catalytic amount thereof) a cold curing composition of superior resistance to water absorption is obtained.

It will be understood that modifications and variations may be effected without departing from the scope of the novel concepts of the present invention.

I claim as my invention:

1. A composition comprising, in substantial amounts, (a) epoxide resin resulting from the reaction of a polyhydric phenol free from reactive groups other than phenolic hydroxyl groups with an excess of a compound of the class consisting of aliphatic diepoxide and aliphatic epihalohydrin, such compound being free from reactive groups other than epoxide, halogen and alcoholic hydroxyl groups and (b) condensate resulting from the reaction of a polyamine wherein the amino groups are of the class consisting of primary and secondary amino groups with fatty acid pitch in a ratio such that for each molar equivalent of pitch based on its saponification value there is one molar equivalent of a reactive amino group in the polyamine plus the molar equivalent of at least two additional amine hydrogen atoms; wherein the weight ratio of (a):(b) ranges from 1:10 to 10:1.

2. A composition comprising, in substantial amounts, (a) epoxide resin resulting from the reaction of a polyhydric phenol free from reactive groups other than phenolic hydroxyl groups with an excess of a compound of the class consisting of aliphatic diepoxide and aliphatic epihalohydrin, such compound being free from reactive groups other than epoxide, halogen and alcoholic hydroxyl groups and (b) condensate resulting from the heat reaction of a polyamine wherein the amino groups are of the class consisting of primary and secondary amino groups with vegetable fatty acid pitch in a ratio such that for each molar equivalent of pitch based on its saponification value there is one molar equivalent of a reactive amino group in the polyamine plus the molar equivalent of at least two additional amine hydrogen atoms; wherein the weight ratio of (a):(b) ranges from 1:10 to 10:1.

3. A composition comprising, in substantial amounts, (a) epoxide resin resulting from the reaction of a polyhydric phenol free from reactive groups other than phenolic hydroxyl groups with an excess of a compound of the class consisting of aliphatic diepoxide and aliphatic epihalohydrin, such compound being free from reactive groups other than epoxide, halogen and alcoholic hydroxyl groups and (b) condensate resulting from the reaction of a polyamine wherein the amino groups are of the class consisting of primary and secondary amino groups with cottonseed oil pitch in a ratio such that for each molar equivalent of pitch based on its saponification value there is one molar equivalent of a reactive amino group in the polyamine plus the molar equivalent of at least two additional amine hydrogen atoms; wherein the weight ratio of (a):(b) ranges from 1:10 to 10:1.

4. A composition comprising, in substantial amounts, (a) epoxide resin resulting from the reaction of a polyhydric phenol free from reactive groups other than phenolic hydroxyl groups with an excess of epichlorhydrin and (b) condensate resulting from the reaction of a polyamine wherein the amino groups are of the class consisting of primary and secondary amino groups with fatty acid pitch in a ratio such that for each molar equivalent of pitch based on its saponification value there is one molar equivalent of a reactive amino group in the polyamine plus the molar equivalent of at least two additional amine hydrogen atoms; wherein the weight ratio of (a):(b) ranges from 1:10 to 10:1.

5. A composition comprising, a substantial amounts, (a) epoxide resin resulting from the reaction of a polyhydric phenol free from reactive groups other than phenolic hydroxyl groups with an excess of a compound of the class consisting of aliphatic diepoxide and aliphatic epihalohydrin, such compound being free from reactive groups other than epoxide, halogen and alcoholic hydroxyl groups and (b) condensate resulting from the reaction of an acyclic polyalkylene polyamine wherein the amino groups are of the class consisting of primary and secondary amino groups with fatty acid pitch in a ratio such that for each molar equivalent of pitch based on its saponification value there is one molar equivalent of a reactive amino group in the polyamine plus the molar equivalent of at least two additional amine hydrogen atoms; wherein the weight ratio of (a):(b) ranges from 1:10 to 10:1.

6. A composition comprising, in substantial amounts, (a) epoxide resin resulting from the reaction of a polyhydric phenol free from reactive groups other than phenolic hydroxyl groups with an excess of a compound of the class consisting of aliphatic diepoxide and aliphatic epihalohydrin, such compound being free from reactive groups other than epoxide, halogen and alcoholic hydroxyl groups and (b) condensate resulting from the reaction of triethylene tetramine with fatty acid pitch in a ratio such that for each molar equivalent of pitch based on its saponifiction value there is one molar equivalent of a reactive amino group in the polyamine plus the molar equivalent of at least two additional amine hydrogen atoms; wherein the weight ratio of (a):(b) ranges from 1:10 to 10:1.

7. A composition comprising, in substantial amounts, (a) epoxide resin resulting from the reaction of diphenylol propane with an excess of a compound of the class consisting of aliphatic diepoxide and aliphatic epihalohydrin, such compound being free from reactive groups other than epoxide, halogen and alcoholic hydroxyl groups and (b) condensate resulting from the reaction of a polyamine wherein the amino groups are of the class consisting of primary and secondary amino groups with a fatty acid pitch in a ratio such that for each molar equivalent of pitch based on its saponification value there is one molar equivalent of a reactive amino group in the polyamine plus the molar equivalent of at least two additional amine hydrogen atoms; wherein the weight ratio of (a):(b) ranges from 1:10 to 10:1.

8. A composition comprising, in substantial amounts (a) epoxide resin resulting from the reaction of diphenylol propane with an excess of epichlorhydrin and (b) condensate resulting from the reaction of triethylene tetramine with cottonseed oil pitch in a ratio such that for each molar equivalent of pitch based on its saponification value there is one molar equivalent of a reactive amino group in the polyamine plus the molar equivalent of at least two additional amine hydrogen atoms; wherein the weight ratio of (a):(b) ranges from 1:10 to 10:1.

9. A process of forming complex infusible amine-epoxy reaction products which comprises heating a composition comprising, in substantial amounts, (a) epoxide resin resulting from the reaction of a polyhydric phenol free from reactive groups other than phenolic hydroxyl groups with an excess of a compound of the class consisting of aliphatic diepoxide and aliphatic epihalohydrin, such compound being free from reactive groups other than epoxide, halogen and alcoholic hydroxyl groups and (b) condensate resulting from the reaction of a polyamine wherein the amino groups are of the class consisting of primary and secondary amino groups with vegetable fatty acid pitch to effect cross-linking of the resin (a) in a ratio such that for each molar equivalent of pitch based on its saponification value there is one molar equivalent of a reactive amino group in the polyamine plus the molar equivalent of at least two additional amine hydrogen atoms; wherein the weight ratio of (a):(b) ranges from 1:4 to 10.1.

10. A process of forming complex amine-epoxy reaction products which comprises thoroughly admixing and reacting, in the presence of a dialdehyde catalyst, (a) epoxide resin resulting from the reaction of a polyhydric phenol free from reactive groups other than phenolic hydroxyl groups with an excess of a compound of the class consisting of aliphatic diepoxide and aliphatic epihalohydrin, such compound being free from reactive groups other than epoxide, halogen and alcoholic hydroxyl groups with (b) condensate resulting from the reaction of triethylene tetramine with cottonseed oil pitch in a ratio such that for each molar equivalent of pitch based on its saponification value there is one molar equivalent of a reactive amino group in the polyamine plus the molar equivalent of at least two additional amine hydrogen atoms; wherein the weight ratio of (a):(b) ranges from 1:4 to 10:1.

11. An infusible insoluble reaction product of (a) epoxide resin resulting from the reaction of a polyhydric phenol free from reactive groups other than phenolic hydroxyl groups with an excess of a compound of the class consisting of aliphatic diepoxide and aliphatic epihalohydrin, such compound being free from reactive groups other than epoxide, halogen and alcoholic hydroxyl groups with (b) condensate resulting from the reaction of a polyamine wherein the amino groups are of the class consisting of primary and secondary amino groups with fatty acid pitch in a ratio such that for each molar equivalent of pitch based on its saponification value there is one molar equivalent of a reactive amino group in the polyamine plus the molar equivalent of at least two additional amine hydrogen atoms; wherein the weight ratio of (a):(b) ranges from 1:4 to 10:1.

References Cited in the file of this patent

UNITED STATES PATENTS

| 2,589,245 | Greenlee | Mar. 18, 1952 |
| 2,681,901 | Wiles et al. | June 22, 1954 |

OTHER REFERENCES

"Asphalts and Allied Substances," by Abraham, 4th edition, (1937), pages 394–395.